United States Patent
Zhou et al.

(10) Patent No.: US 11,303,236 B2
(45) Date of Patent: Apr. 12, 2022

(54) INDUCTION MOTOR OVERHEAT MONITORING METHOD, INDUCTION MOTOR MONITORING DEVICE, AND INDUCTION MOTOR CONTROL SYSTEM

(71) Applicant: Hitachi Industrial Equipment Systems Co., Ltd., Tokyo (JP)

(72) Inventors: Guangbin Zhou, Tokyo (JP); Yoshitaka Iwaji, Tokyo (JP); Satoru Kaneko, Tokyo (JP); Kazuaki Tobari, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 17/048,633

(22) PCT Filed: Nov. 29, 2018

(86) PCT No.: PCT/JP2018/043946
§ 371 (c)(1),
(2) Date: Oct. 19, 2020

(87) PCT Pub. No.: WO2019/244370
PCT Pub. Date: Dec. 26, 2019

(65) Prior Publication Data
US 2021/0152111 A1    May 20, 2021

(30) Foreign Application Priority Data

Jun. 21, 2018   (JP) .............................. JP2018-117614

(51) Int. Cl.
*H02P 21/16*    (2016.01)
*H02P 21/22*    (2016.01)
(Continued)

(52) U.S. Cl.
CPC ................ *H02P 21/16* (2016.02); *B21B 3/02* (2013.01); *H02P 5/74* (2013.01); *H02P 21/22* (2016.02)

(58) Field of Classification Search
CPC . H02P 21/16; H02P 5/74; H02P 21/22; H02H 6/005
(Continued)

(56) References Cited

U.S. PATENT DOCUMENTS 4,926,105 A  *  5/1990  Mischenko ............. H02P 21/06
                                                                318/800
2010/0156338 A1    6/2010  Lu et al.
2018/0198402 A1    7/2018  Takahei et al.

FOREIGN PATENT DOCUMENTS

JP          01-274685 A      11/1989
JP          03-107327 A       5/1991
(Continued)

OTHER PUBLICATIONS

International Search Report of PCT/JP2018/043946 dated Feb. 19, 2020.

*Primary Examiner* — David Luo
(74) *Attorney, Agent, or Firm* — Mattingly & Malur, PC

(57) ABSTRACT

An induction motor overheat monitoring method and device detects overheating of an induction motor from a detection value of a current sensor. A resistance calculation relationship data indicating a relationship between a resistance and a feature amount at the time of starting of the induction motor and a determination reference value for determining overheating are stored in advance. At each starting, a current of the induction motor is detected, a signal regarding a phase angle difference is calculated, and a feature amount of the motor is calculated from the signal regarding the phase angle difference. Further, a resistance of the induction motor is calculated by using the feature amount of the motor and the (Continued)

resistance calculation reference data stored in advance. Then, a temperature of the induction motor is calculated from the resistance of the induction motor, and it is determined if the motor is overheated.

13 Claims, 6 Drawing Sheets

(51) Int. Cl.
*B21B 3/02* (2006.01)
*H02P 5/74* (2006.01)

(58) Field of Classification Search
USPC .................................................. 318/112, 34
See application file for complete search history.

(56) References Cited

FOREIGN PATENT DOCUMENTS

| | | |
|---|---|---|
| JP | 2017-175820 A | 9/2017 |
| WO | 2017/195301 A1 | 11/2017 |

* cited by examiner

INDUCTION MOTOR OVERHEAT MONITORING METHOD, INDUCTION MOTOR MONITORING DEVICE, AND INDUCTION MOTOR CONTROL SYSTEM

TECHNICAL FIELD

The present invention relates to an induction motor overheat monitoring method, an overheat monitoring device, and an induction motor control system using the overheat monitoring device.

BACKGROUND ART

An induction motor that is installed in an industrial hoist drive system and that starts and stops frequently has a starting current that is several times a motor rated current. Especially, since the next start operation starts in a state in which a rotor provided more inside than a stator is not yet sufficiently cooled, the rotor is overheated, which is more likely to cause insulation breakdown of a winding and an iron core of the motor, and even a burnout.

In order to prevent such a failure in advance, an overheat monitoring device that uses speed sensor, current sensor, and temperature sensor information of a motor has been reported (PTL 1). Also, an estimation method for estimating a temperature rise of a rotor from an ambient temperature and a stator temperature measured by a temperature sensor has been reported (PTL 2).

CITATION LIST

Patent Literature

PTL 1: JP 2017-175820 A
PTL 2: JP 1-274685 A

SUMMARY OF INVENTION

Technical Problem

However, in PTL 1, the speed sensor is required in addition to the current sensor for each monitoring target. Further, in technique of PTL 2, the temperature sensor is required in addition to a current sensor for each monitoring target. Therefore, the number of related devices including the sensors increases, and the cost of entire equipment increases.

In addition, there is a problem that it is difficult to install the sensors when there is a dimensional restriction on an installation location of the motor or under severe environmental conditions. Furthermore, as the number of sensors increases, it is more difficult to secure reliability of a sensor group, and monitoring accuracy decreases. For this reason, there is a demand for an induction motor overheat monitoring device that does not use sensors as much as possible. When the number of sensors is reduced, maintainability and reliability are greatly improved. Specifically, it is possible to reduce maintenance work of the sensors and prevent a system from going down due to a failure of the sensor. Further, since system outfitting wiring for the sensor can be reduced, the working cost can be reduced, and there is no concern about wiring trouble.

An object of the present invention is to provide an induction motor overheat monitoring method, an induction motor overheat monitoring device, and an induction motor control system, which estimates a temperature of the motor from a detection value of a current sensor and monitors an overheat state.

Solution to Problem

As one example of the present invention, an induction motor overheat monitoring method in a motor control system equipped with at least one induction motor, an inverter that supplies an alternating current to the induction motor, and a control unit that controls the inverter, the induction motor overheat monitoring method including: storing resistance calculation relationship data indicating a relationship between a resistance and a feature amount at a time of starting of the induction motor and a determination reference value for determining the temperature overheat; detecting a current of the induction motor; obtaining a phase angle from the detected current, and calculating a signal regarding a phase angle difference from a difference between the phase angle and a signal in which the phase angle is phase-synchronized, at each starting during an operation period; calculating a feature amount of the motor from the signal regarding the phase angle difference; calculating a resistance of the induction motor by using the feature amount of the motor and the resistance calculation reference data, and then calculating a temperature of the induction motor from the calculated resistance; and determining an overheat state by comparing the calculated temperature of the induction motor and the determination reference value.

Further, as another example of the present invention, an induction motor overheat monitoring device in a motor control system equipped with at least one induction motor, an inverter that supplies an alternating current to the induction motor, and a control unit that controls the inverter, the induction motor overheat monitoring device including: a data storage unit that stores resistance calculation relationship data indicating a relationship between a resistance and a feature amount at a time of starting of the induction motor and a determination reference value for determining overheating; a current sensor that detects a current of the induction motor; a motor information calculation unit that obtains a phase angle from the detected current, and calculates a signal regarding a phase angle difference from a difference between the phase angle and a signal in which the phase angle is phase-synchronized, at each starting during an operation period; a feature amount calculation unit that calculates a feature amount of the motor obtained from the signal regarding the phase angle difference; a temperature calculation unit that calculates a resistance of the induction motor by using the feature amount of the motor and the resistance calculation relationship data, and then calculates a temperature of the induction motor from the calculated resistance; and an overheat determination unit that determines an overheat state by comparing the calculated temperature of the induction motor and the determination reference value.

Advantageous Effects of Invention

According to the present invention, the temperature of the induction motor can be estimated based on the detection value of the alternating current, and the overheat state can be monitored.

DESCRIPTION OF EMBODIMENTS

Figure 1:
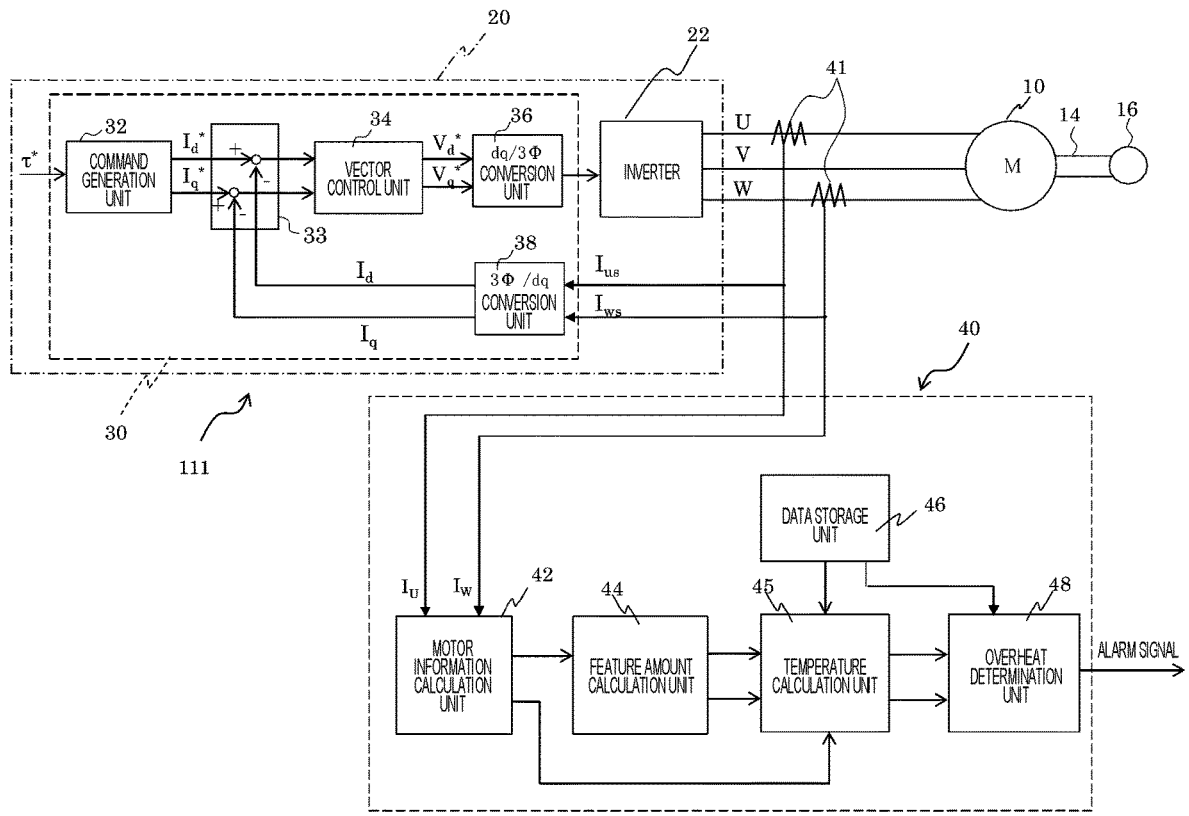
FIG. 1 is a diagram showing an induction motor control system according to a first embodiment of the present invention.

Various embodiments of the present invention will be described below with reference to the drawings. Note that, in the drawings of the embodiments, the same components are denoted by the same reference numerals, and detailed description thereof may be omitted.

First Embodiment

FIG. 1 is a block diagram of an induction motor control system showing a first embodiment of the present invention. In FIG. 1, an induction motor control system 111 includes an induction motor 10, a drive device 20, a monitoring device 40 (motor monitoring device), and a plurality of current sensors 41. The drive device 20 includes an inverter 22 and a control unit 30. Also, a rotary shaft 14 of the induction motor 10 is connected to a drive mechanism 16 directly or via a mechanical component such as a gear (not shown). The inverter 22 applies three-phase AC voltages to the induction motor 10 under the control of the control unit 30. Note that in the description below, the induction motor may be referred to as a motor.

In FIG. 1, the drive device 20 controls speed and torque of the motor 10, and here, the control unit 30 is described as controlling the inverter using a known vector control method.

The control unit 30 includes hardware such as a CPU (Central Processing Unit) and a RAM (Random Access Memory) as a general computer, and stores a control program, various data, and the like. Similarly, the monitoring device 40 also includes hardware as a general computer. However, in FIG. 1, functions of the control unit 30 and the monitoring device 40 are shown as a block diagram for easy understanding.

(Explanation of Operation of Control Unit 30)

The control unit 30 includes a command generation unit 32, a deviation calculation unit 33, a vector control unit 34, a dq/3Φ conversion unit 36, and a 3Φ/dq conversion unit 38. With these configurations, the control unit 30 performs vector control on the motor 10 to improve responsiveness of the motor 10. The inverter 22 outputs three-phase alternating currents of U phase, V phase, W phase to the motor 10. The current sensors 41 detect arbitrary two-phase currents among them. In other words, in an illustrated example, the U-phase and W-phase currents are detected, and results thereof are output as current detection values $I_{us}$ and $I_{ws}$. Note that the detection values of the current sensors 41 are also used in the monitoring device 40 described later. Here, assuming rotating coordinates that rotate at a frequency f, axes orthogonal to these rotating coordinates are referred to as a d axis and a q axis, and a current supplied to the motor 10 is expressed as a DC amount at the rotating coordinates. A current on the q axis is a current component that determines torque of the motor 10, and is hereinafter referred to as a torque current.

In addition, a current on the d axis is a component that becomes an exciting current of the motor 10, and is hereinafter referred to as an exciting current. The 3Φ/dq conversion unit 38 outputs an exciting current detection value $I_d$ and a torque current detection value $I_q$ based on the current detection values $I_{us}$ and $I_{ws}$. The command generation unit 32 receives a torque command value τ* from a host device (not shown) and generates an exciting current command value $I_d^*$ and a torque current command value $I_q^*$ based on the torque command τ*. The deviation calculation unit 33 outputs deviations $I_d^*-I_d$, $I_q^*-I_q$ based on the current command values $I_d^*$, $I_q^*$ and the detection values $I_d$, $I_q$. The vector control unit 34 outputs an exciting voltage command value $V_d^*$ and a torque voltage command value $V_q^*$ based on the deviations $I_d^*-I_d$, $I_q^*-I_q$, and the like. The dq/3Φ conversion unit 36 outputs a PWM signal for driving the inverter 22 based on the voltage command values $V_d^*$, $V_q^*$ of the rotating coordinate system. The inverter 22 switches a supplied DC voltage (not shown) based on the supplied PWM signal and outputs U-phase, V-phase, and W-phase voltages to drive the motor 10.

(Configuration of Monitoring Device 40)

The monitoring device 40 includes a motor information calculation unit 42, a feature amount calculation unit 44, a temperature calculation unit 45, a data storage unit 46 that stores data necessary for calculation, and an overheat determination unit 48. Note that description of operation and processing contents of each configuration of the monitoring device 40 will be described after a motor temperature estimation method is described.

(Motor Temperature Estimation Method)

Next, a motor temperature estimation method in this embodiment will be described.

As is generally well known, a motor resistance value or the like of the motor 10 varies depending on an operating temperature. Here, a certain temperature T0 is referred to as "reference temperature T0", and a parameter such as a resistance value or the like at the reference temperature is referred to as "reference value". When the temperature of the motor 10 rises, the motor resistance value increases. A relationship between motor temperature T and a motor resistance value RT is expressed by the following equation (1).

$$RT = R0 = (\delta + T)/(\delta + T0) \qquad \text{Equation (1)}$$

In the equation (1), δ is a reciprocal of a resistance temperature coefficient of a winding copper wire, and R0 is a motor resistance reference value, that is, the motor resistance value at the reference temperature T0. According to the equation (1), for example, when a temperature rise of 40° C. occurs with respect to the reference temperature, the motor resistance value RT becomes about 1.1 times the motor resistance reference value R0. Further, when the temperature rise of 70° C. occurs with respect to the reference temperature, the motor resistance value RT becomes about 1.2 times the motor resistance reference value R0. Note that the same equation can be applied to a case where the winding is an aluminum wire or the like.

Figure 2:
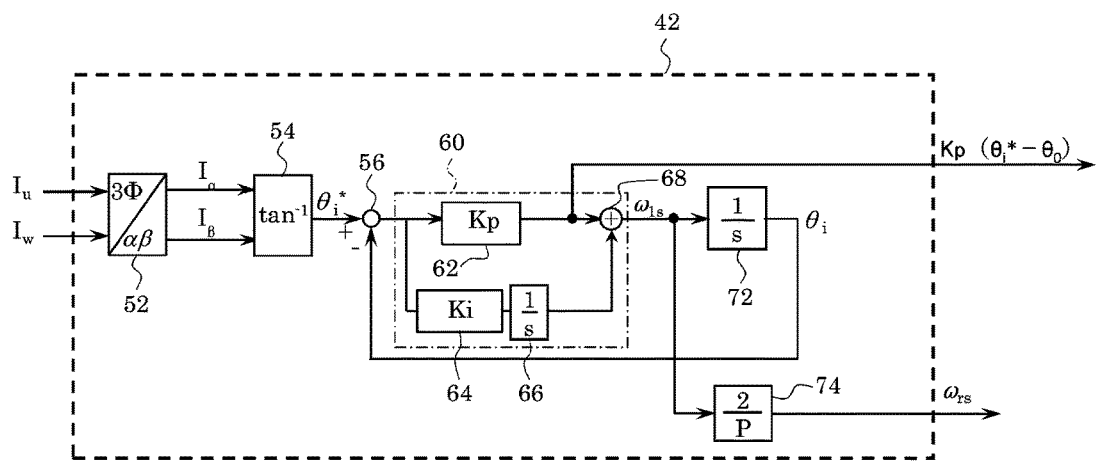
FIG. 2 is a block diagram showing details of a motor information calculation unit in the first embodiment.

Next, how to obtain a resistance of the motor according to the first embodiment of the present invention will be described with reference to FIG. 2. FIG. 2 is a diagram showing a specific circuit configuration of the motor information calculation unit 42 in FIG. 1. The motor information calculation unit 42 includes a 3Φ/αβ converter 52, an arctangent converter 54, a subtractor 56, a phase synchronization calculation unit 60, an integrator 72, and a multiplier 74. The phase synchronization calculation unit 60 is composed of multipliers 62 and 64, an integrator 66, and an adder 68.

First, the motor information calculation unit 42 calculates a phase angle of a current flowing through the motor. The 3Φ/αβ converter 52 converts current detection values $I_u$, $I_w$ into orthogonal two-phase alternating currents $I_\alpha$, $I_\beta$. The arctangent converter 54 calculates an alternating current phase angle $\theta_i^*$ based on these alternating currents $I_\alpha$, $I_\beta$. Next, the phase angle $\theta_i^*$ is input to a phase synchronization circuit, and a phase angle difference signal that is a difference ($\theta_i^* - \theta_{1i}$) from a phase angle $\theta_i$ phase-synchronized by the phase synchronization circuit is calculated.

This phase angle difference signal ($\theta_i^* - \theta_i$) is multiplied by a predetermined proportional gain Kp by the multiplier 62, and a proportional signal $Kp(\theta_i^* - \theta_0)$ of the phase difference signal is output.

By the way, the inventor has found that a feature amount obtained from the proportional signal $Kp(\theta_i^* - \theta_0)$ of the phase difference signal when starting (at the time of starting) the motor largely varies depending on a resistance value of the motor. In the embodiment of the present invention, the resistance of the motor is obtained using this knowledge, and a temperature of the motor is calculated from the resistance of the motor. The details will be described later.

Note that in a case of FIG. 2, the proportional signal of the phase angle difference signal at the time of starting the motor is output and used for the calculation of the resistance, but instead of the proportional signal of the phase angle difference signal, a phase angle difference signal which is an output of the subtractor 56 may be used. This is because the phase angle difference signal and the proportional signal of the phase angle difference signal are in a proportional relationship, and therefore feature amounts themselves of signal waveforms at the time of starting are the same. Therefore, either of the phase angle difference signal and the proportional signal of the phase angle difference signal is referred to as "signal regarding phase angle difference".

Further, the phase angle difference signal ($\theta_i^* - \theta_i$), which is the output of the subtractor 56 in FIG. 2, is input to the multiplier 64, where it is multiplied by a predetermined integration gain Ki. The integrator 66 integrates this multiplication result.

The adder 68 adds an output of the multiplier 62 and an output of the integrator 66, and outputs an addition result as a frequency signal $\omega_{1s}$. The integrator 72 integrates the frequency signal $\omega_{1s}$ and outputs an alternating current phase angle $\theta_i$. The alternating current phase angle $\theta_i$ is supplied to the subtractor 56. Further, the multiplier 74 multiplies the frequency signal $\omega_{1s}$ by "2/P" (where P is the number of poles of the motor 10), and outputs a multiplication result as a mechanical frequency $\omega_{rs}$. Here, the mechanical frequency $\omega_{rs}$ becomes a signal corresponding to an actual speed (speed including slip) of the motor 10 (see FIG. 1).

In this way, the subtractor 56, the phase synchronization calculation unit 60, and the integrator 72 function as the phase synchronization circuit, and output the frequency signal $\omega_{1s}$ and the alternating current phase angle $\theta_i$ so that the difference value "$\theta_i^* - \theta_i$" output by the subtractor 56 approaches "0".

Figure 3:
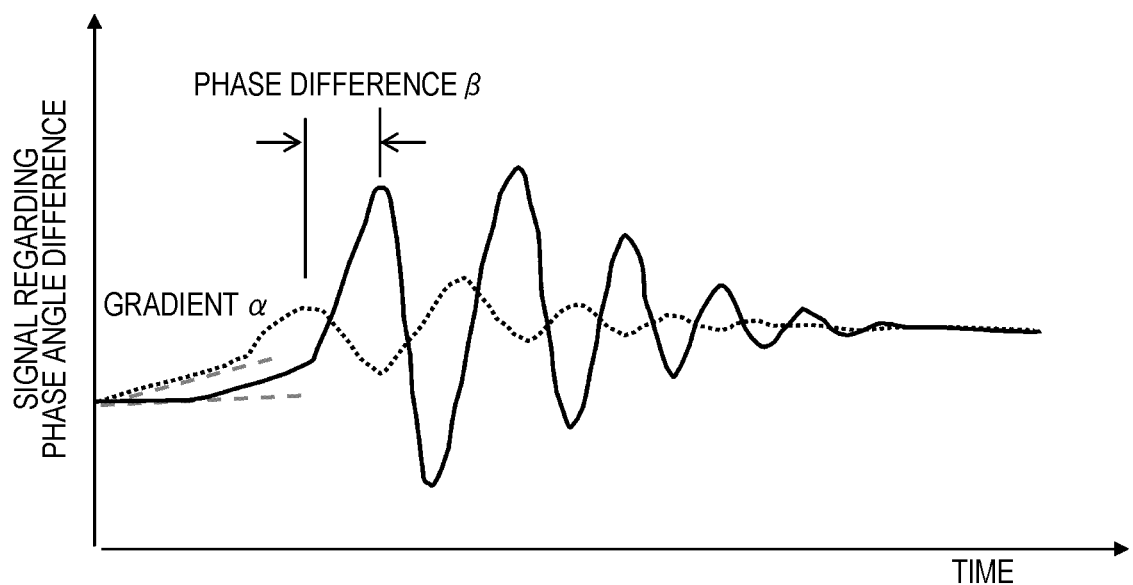
FIG. 3 is a graph showing a proportional signal waveform when a current phase angle at the time of starting the motor is phase-synchronized.

Here, a result of evaluation by simulation of a change in the signal regarding the phase angle difference when a stator resistance R1 and a rotor resistance R2 of the motor change will be described. FIG. 3 is a graph showing a change in the signal regarding the phase angle difference when the motor is started. In FIG. 3, a waveform indicated by a broken line shows a waveform of the motor resistance (stator resistance R1, rotor resistance R2) at the time of starting when the motor is at the reference temperature T0, and a waveform indicated by a solid line shows a waveform of the motor resistance at the time of starting during operation that frequently repeats starting and stopping. As can be seen from FIG. 3, when the reference waveform (the waveform indicated by the broken line) and the waveform during the operation (the waveform indicated by the solid line) are compared, a gradient α and a phase difference β of the two waveforms are different. Note that, here, the gradient α and the phase difference β of the waveforms are collectively referred to as "feature amount of motor". Further, "at the time of starting" means not only initiation time of starting but also a period from initiation of starting to time when acceleration is being performed. In addition, "at the time of starting" and "when starting" are used in the same meaning here.

Figure 4:
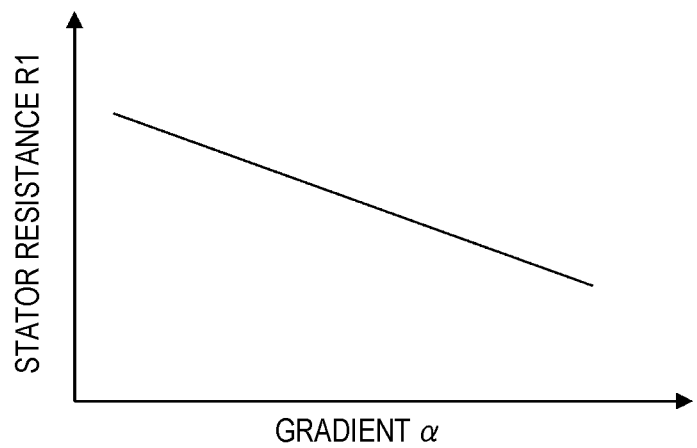
FIG. 4 is a graph showing a relationship between a stator resistance and a gradient obtained from two output signal waveforms of a phase synchronization circuit when starting the motor.
Figure 5:
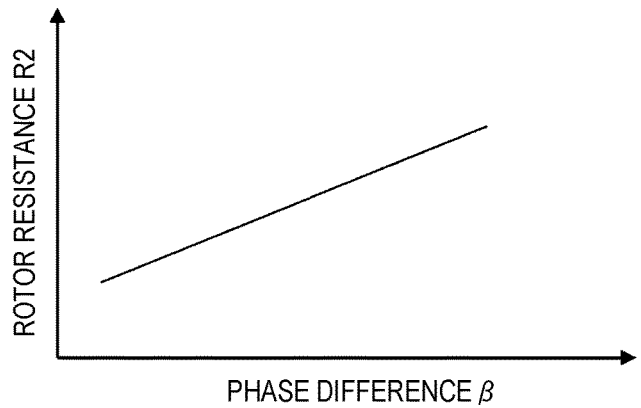
FIG. 5 is a graph showing a relationship between a rotor resistance and a phase difference obtained from the two output signal waveforms of the phase synchronization circuit when starting the motor.

FIGS. 4 and 5 each show a relationship between the feature amount of the motor and the resistance of the motor. In FIG. 3, when the waveform of the phase-synchronized proportional signal at the time of starting in the reference stator resistance is compared, the gradient of the waveform is α and the phase difference thereof is β. FIG. 4 is a graph showing a relationship between the gradient α and the stator resistance R1. Further, FIG. 5 is a graph showing a relationship between the phase difference β and the rotor resistance R2.

As can be seen from FIG. 4, the gradient α is inversely proportional to the stator resistance R1 (the larger the gradient, the smaller R1). Further, as can be seen from FIG. 5, the phase difference β is proportional to the rotor resistance R2 (the larger the phase difference, the larger R2). In other words, influence of the stator resistance R1 is dominant in the gradient α with respect to a reference value of rise at the time of starting of the signal regarding the phase angle difference obtained based on the phase angle. Further, it can be seen that influence of the rotor resistance R2 is dominant in the phase difference β of the signal regarding the phase angle difference.

Therefore, the resistance of the motor at that time can be obtained by previously obtaining and storing the relationships of FIGS. 4 and 5 in the memory, and applying the feature amount at that time to the relationships stored in the memory at each starting during continuous operation. The relationship between the resistance and the feature amount of the motor as shown in FIGS. 4 and 5 will be referred to as "resistance calculation relationship data" below.

Note that the reason why the above relationship occurs is not exactly understood, but the inventor considers it as follows. First, as shown in an equation (2), when the stator resistance R1 increases, since a motor voltage V1 remains constant, a motor stator current I1 decreases, and rise of the current is delayed. As a result, the gradient α of the signal regarding the phase angle difference at the time of starting is small. On the other hand, a slip frequency $S_s$ of the induction motor is proportional to the rotor resistance R2 as shown in an equation (3), $S_s$ increases when the rotor resistance R2 increases, and motor torque for increasing the speed is required. As a result, larger torque current needs to be supplied. In other words, it is suggested that a motor current phase advances more than the reference value and the phase of the signal regarding the phase angle difference also advances in proportion to the rotor resistance R2.

$$I1=V1/R1 \qquad \text{Equation (2)}$$

$$S_s=(R2 \times Iq)/(L2 \times Id) \qquad \text{Equation (3)}$$

Here, Iq is a motor torque current, L2 is a motor rotor side inductance, and Id is a motor exciting current.

As described above, the stator resistance R1 and the rotor resistance R2 of the induction motor can be estimated based on the feature amount of the motor (gradient α and phase difference β) in the signal regarding the phase angle difference at the time of starting the motor. In other words, the relationships shown in FIG. 4 and FIG. 5 are obtained and stored in advance by experiments, simulations, etc., and the feature amount of the motor (gradient α and phase difference β) in the signal regarding the phase angle difference at each starting is obtained during continuous operation that repeats starting and stopping. Then, by collating this feature amount of the motor with resistance calculation relationship data (relationship data shown in FIGS. 4 and 5), the stator resistance R1 with respect to α at that time and the rotor resistance R2 with respect to B at that time can be calculated. Then, when the stator resistance R1 and the rotor resistance R2 are obtained, a stator temperature and a rotor temperature can be calculated by applying the resistances to a relational expression of the expression (1).

(Explanation of Operation of Monitoring Device 40)

In the embodiment of FIG. 1, the temperature of the motor is obtained by using the above-described temperature estimation calculation method, and overheat monitoring is performed by comparing the obtained temperature and the reference value for overheat determination. Next, operation of the monitoring device 40 having a temperature estimation function by the above-described method and a function of determining an overheat state of the motor using an estimated temperature will be described.

In FIG. 1, the monitoring device 40 detects a current flowing from the current sensor 41 to the motor. In other words, the motor information calculation unit 42 acquires the U-phase current detection value $I_u$ and the W-phase current detection value $I_w$ from the corresponding current sensors 41. Then, based on these detection values, the motor information calculation unit 42 outputs the signal regarding the phase angle difference (waveform as shown by the solid line in FIG. 3) at each starting of the motor during continuous operation. Obtaining the signal regarding the phase angle difference is as described above, and description thereof is omitted.

The feature amount calculation unit 44 inputs the signal regarding the phase angle difference at the time of starting from the motor information calculation unit 42, and as shown in FIG. 3, extracts the feature amount of the motor (gradient α and phase difference β) which is a waveform deviation from the reference value at the time of starting.

Next, the temperature calculation unit 45 calculates the temperature of the motor (stator temperature R1, rotor temperature R2) based on the feature amount of the motor (gradient α and phase difference β) that is the output of the feature amount calculation unit 44. Specifically, with respect to the resistance calculation relationship data previously recorded in the data storage unit 46 (relationship between the gradient α and R1 shown in FIG. 4, relationship between the phase difference β and R2 shown in FIG. 5), the feature amount at this starting is applied and collated, so that the resistance of the motor at this starting (stator resistance R1, rotor resistance R2) can be calculated. The resistance calculation relationship data can be easily collated when the relationships in FIGS. 4 and 5 are stored as tables. When this motor resistance is obtained, the temperatures of the stator and the rotor of the motor at this starting are calculated using the relationship of the equation (1). Reference data, which is a reference required for calculation and processing of the temperature calculation unit 45, is stored in the data storage unit 46. This reference data includes resistance calculation relationship data and data necessary for calculation of R1, R2 and the motor temperatures.

Note that the reason why the motor speed is input to the temperature calculation unit 45 is to detect the start or stop state of the motor. From this speed information, it is possible to determine whether or not the motor has been started and obtain a subsequent acceleration status. Thereby, it is possible to obtain timing for starting the calculation.

The overheat determination unit 48 inputs the temperatures of the motor obtained by the temperature calculation unit 45, and detects whether the stator or the rotor of the motor 10 is overheated. Specifically, determination reference values of the stator temperature and the rotor temperature for determining the overheat (threshold values T1 and T2) and the stator temperature and the rotor temperature of the motor obtained by the temperature calculation unit 45 are compared. The determination reference values are stored in the data storage unit 46 in advance. Then, if either of the temperatures exceeds either of the determination reference values, it is determined that the motor is in an overheat state. When the overheat state is determined, the overheat determination unit 48 outputs an alarm signal to the outside.

Note that the alarm signal may be any means that can notify an administrator, such as lighting a lamp, sounding an alarm, or transmitting radio waves by wireless communication means. When the monitoring device 40 according to the present embodiment is installed in a harsh environment, it is preferable to store the monitoring device 40 in a dustproof and waterproof monitoring device case. Furthermore, when the monitoring device 40 is installed near a device that generates noise, such as the inverter 22, it is preferable to take noise countermeasures for the monitoring device 40.

Figure 6:
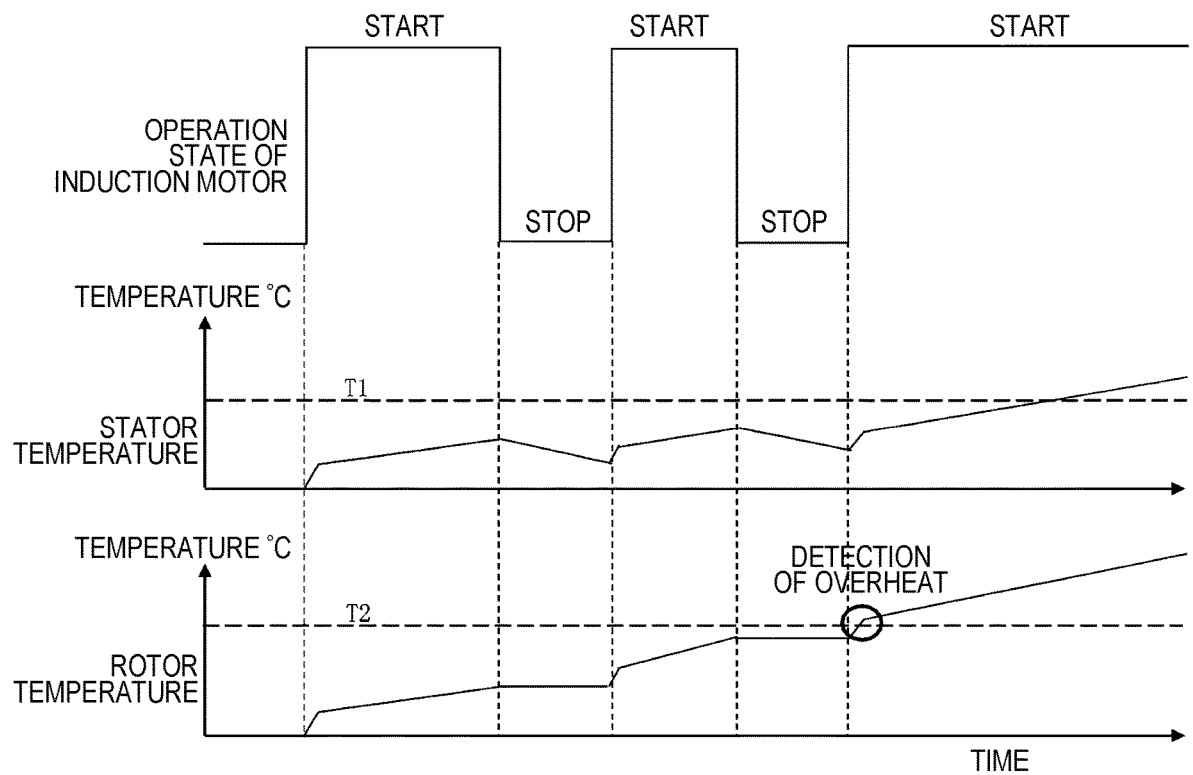
FIG. 6 is a diagram showing an example of overheat detection of the induction motor that frequently starts and stops.

FIG. 6 shows a state where the start and stop are repeated while the motor continuously operates and changes in the temperature of the stator and the temperature of the rotor. T1 is a threshold value used to determine whether the stator is overheated. Also, T2 is a threshold value used to determine whether the rotor is overheated. FIG. 6 shows a case where the temperature of the rotor exceeds the determination reference value T2 of the rotor and overheating is detected.

As described above, the monitoring device 40 can estimate and calculate the motor temperature based on the detection value of the motor current detected by the current sensor, and can detect the overheat state by using the result. Further, since speed information in variable speed drive can be detected in a conversion process, a correlation with rotation speed can be easily analyzed. Further, since the AC can be converted to the DC by the simple algorithm, edge processing for determining abnormality can be executed in the monitoring device. As a result, an amount of data can be significantly reduced, and analysis/diagnosis work is facilitated.

(Description of Overheat Detection Routine in First Embodiment)

Figure 7:
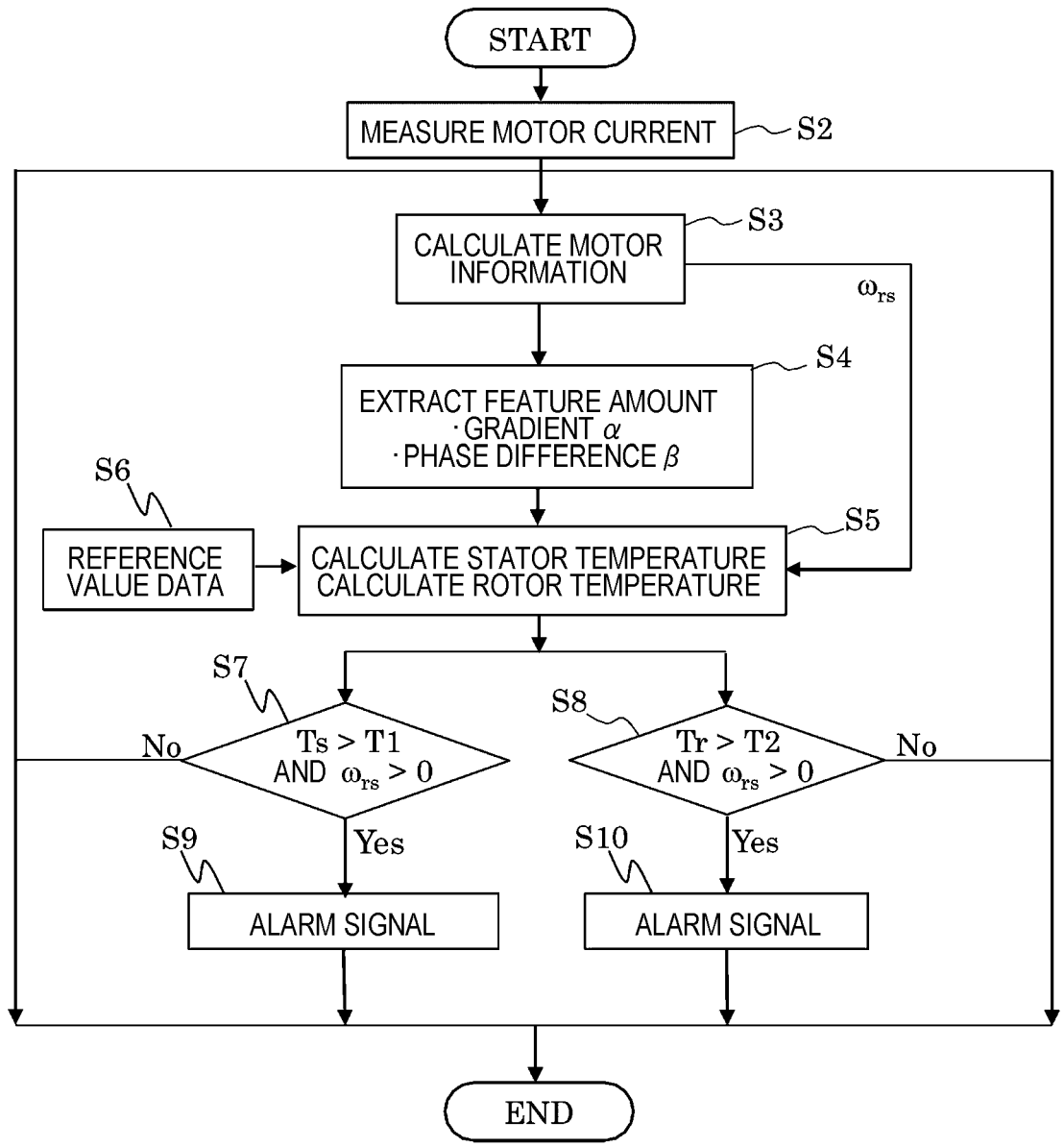
FIG. 7 is a flowchart of an abnormality detection routine executed in the first embodiment.

FIG. 7 is an explanatory diagram of an overheat detection routine executed in the monitoring device 40. This overheat detection routine is executed at every predetermined sampling period at the time of starting the motor 10 (a period from initiation of starting to time when acceleration is being performed).

When the process proceeds to step S2 in FIG. 7, current measurement processing is executed. In other words, as shown in FIG. 1, the monitoring device 40 acquires current detection values $I_u$, $I_w$ from the current sensors 41.

Next, when the process proceeds to step S3, the motor information calculation unit 42 calculates speed $\omega_{rs}$ of the motor 10 and a signal regarding a phase angle difference.

Next, when the process proceeds to step S4, the feature amount calculation unit 44 extracts a feature amount (gradient α and phase difference β) of the motor in the signal regarding the phase angle difference obtained during acceleration of this time.

Next, when the process proceeds to step S5, the temperature calculation unit 45 obtains a resistance of the motor (stator resistance R1, rotor resistance R2) using reference value data shown in step S6 and the feature amount (gradient α, phase difference β) obtained in step S4, and then estimates and calculates a temperature of the motor (stator temperature, rotor temperature) based on this motor resistance. Specifically, the resistances of the motor (stator resistance R1 and rotor resistance R2) are estimated and calculated from the feature amount of the motor (gradient α and phase difference β) obtained in step S4 and the resistance calculation relationship data (relationship data shown in FIGS. 4 and 5) stored in advance, and then the temperatures of the motor (stator temperature Ts and rotor temperature Tr) are calculated from the calculated resistances of the motor. Note that the reference data necessary for processing of step S6 is data including the data table of the gradient α and R1 shown in FIG. 4, the data table of the phase difference β and R2 shown in FIG. 5, data tables of R1, R2, and the temperatures, and so on.

If it is determined in step S7 that the stator temperature Ts exceeds the determination reference value T1 and the motor is in a transient state of starting ($\omega_{rs}>0$), that is, if it is determined to be "Yes" in step S7, the process proceeds to step S9. If the determination in step S7 is "Yes", it indicates that the stator temperature of the motor is in an overheat state. If "NO" in the step S7, the process of this routine is ended and the next process start timing is prepared.

In step S9, a motor overheat alarm signal indicating that the stator of the motor 10 is in the overheat state is output to the outside.

If it is determined in step S8 that the rotor temperature Tr exceeds the determination reference value T2 and the motor is in a transient state of starting $\omega_{rs}>0$), that is, if it is determined to be "Yes" in step S8, the process proceeds to step S10. If the determination in step S8 is "Yes", it indicates that the stator temperature of the motor is in an overheat state. If "NO" in the step S8, the process of this routine is ended and the next process start timing is prepared.

In step S10, a motor overheat alarm signal indicating that the rotor of the motor 10 is in an overheat state is output to the outside.

(Effects of First Embodiment)

As described above, according to the first embodiment, an overheat state of the stator or an overheat state of the rotor of the motor 10 can be detected based on the current values $I_u$, $I_w$ of at least two phases. In other words, by omitting the temperature sensor, the speed sensor, and the like, a failure can be prevented in advance while saving labor for maintenance.

Further, since the overheat determination unit 48 outputs an alarm signal when detecting an overheat state of the motor 10, it is possible to notify an administrator of various abnormalities. The alarm of the present embodiment may be any means that can notify the administrator, such as a lamp, an alarm, or wireless communication means.

In addition, when installing in a harsh environment, it is desirable to take dustproof and waterproof measures for the monitoring device case. Furthermore, when installing near a device that generates noise such as an inverter, it is desirable to take measures against noise for the monitoring device.

Note that, in the first embodiment, both the stator temperature and the rotor temperature of the motor are calculated, and the overheat states of both the temperatures are monitored. However, in the present invention, it is not always necessary to obtain both the stator temperature and the rotor temperature, and it is also valid to calculate and monitor either one of the temperatures. If either one of the temperatures is monitored, it is preferable to determine the overheat state of the temperature of the rotor which is difficult to cool from the viewpoint of safety.

Second Embodiment

Figure 8:
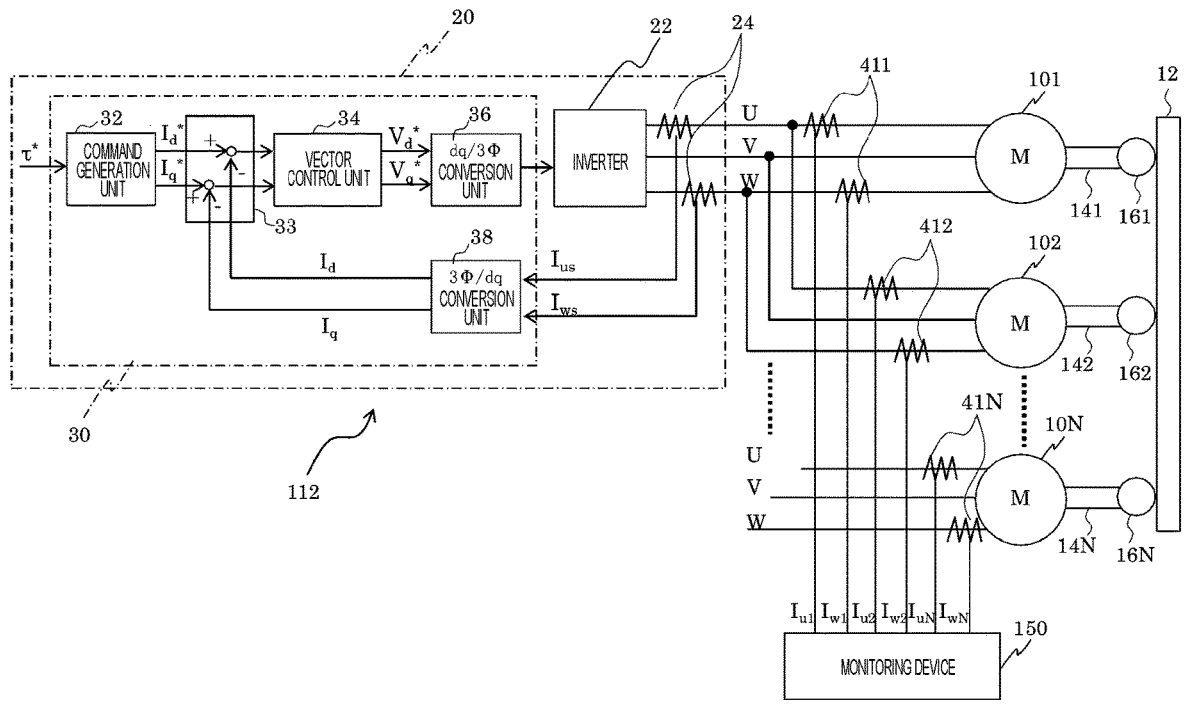
FIG. 8 is a diagram showing an induction motor control system according to a second embodiment.

FIG. 8 is a diagram showing a second embodiment of the present invention. Note that, in the following description, parts corresponding to the parts of the above-described embodiment are designated by the same reference numerals, detailed description thereof is omitted, and different contents are mainly described.

In FIG. 8, an induction motor control system 112 includes N (N is a natural number of 2 or more) motors 101 to 10N, and N drive mechanisms 161 to 16N coupled to the motors 101 to 10N via rotary shafts 141 to 14N, and a load 12 driven by the N motors (in this example, the load is a conveyed object conveyed by driving force of the motors). Also, a U phase and a W phase of each motor 101-10N is equipped with two current sensors 411-41N (2N in total), and current detection values $I_{u1}$ to $I_{uN}$, $I_{w1}$ to $I_{wN}$ of these are supplied to a monitoring device 150.

A configuration of the monitoring device 150 is basically the same as that of the monitoring device 40 (see FIG. 1) in the first embodiment, and thus detailed description thereof will be omitted. In other words, the monitoring device 40 of the first embodiment is configured to monitor the one motor, whereas the monitoring device 150 is different in that it monitors overheat states of the N motors.

Third Embodiment

Figure 9:
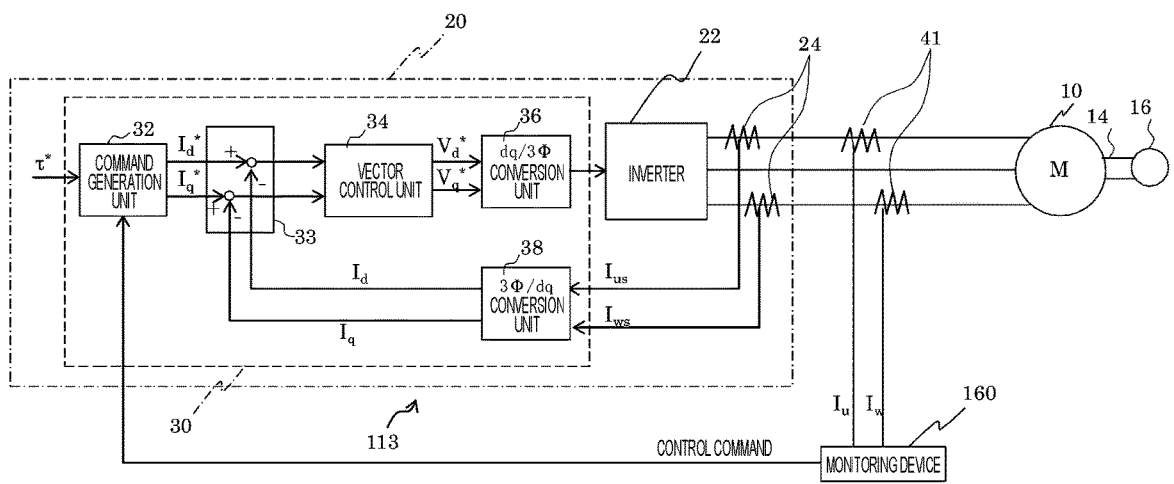
FIG. 9 is a diagram showing an induction motor control system according to a third embodiment.

FIG. 9 is a diagram showing a third embodiment of the present invention. Note that, in the following description, parts corresponding to the parts of the other embodiments described above are denoted by the same reference numerals, detailed description thereof is omitted, and different contents are mainly described.

An induction motor control system 113 in FIG. 9 and the induction motor control system 111 in FIG. 1 have basically the same configuration. Although a configuration of a monitoring device 160 in FIG. 9 and a configuration of the monitoring device 40 in the first embodiment are almost the same, the monitoring device 160 shown in FIG. 9 is different in a method of coping with a case where an overheat state of a motor is detected. In other words, the monitoring device 160 is configured to supply a control command for reducing a temperature of the motor to the induction motor control system 113 instead of outputting the alarm signal. The control command is given to a command generation unit 32, and this command is changed. Here, the control command is, for example, a command to stop or decelerate the motor 10. As a result, the overheat state of the motor 10 is eliminated, and safer and more efficient operation can be achieved. Note that, in addition to this, in the embodiment of FIG. 9, detection of a phase current required for the control system 113 is detected by a separately provided current sensor 24. However, this current sensor may be shared with a control unit 30 and the monitoring device 150 as in FIG. 1, instead of being separately installed.

Thus, according to the third embodiment, when at least one of an overheat state of a stator or a rotor of the motor 10 is detected, a control command for changing a control state is output to the control unit 30. As a result, the control state of the control unit 30 can be changed to an appropriate state.

Fourth Embodiment

Figure 10:
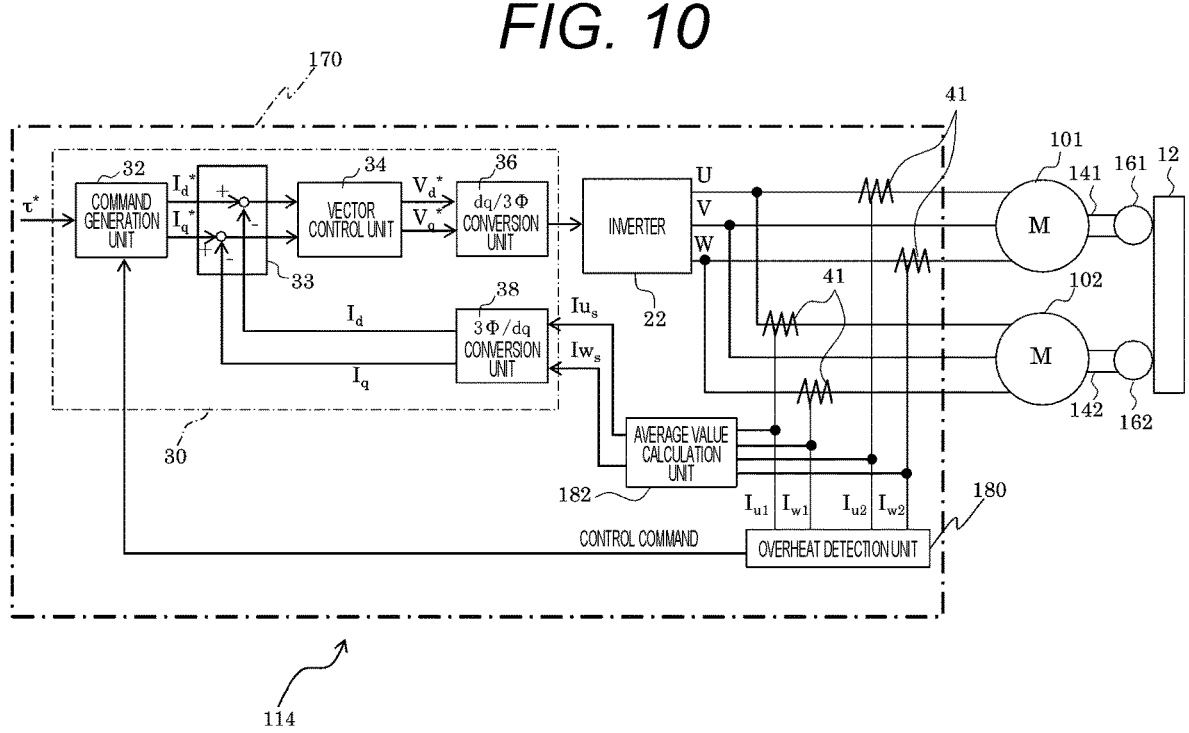
FIG. 10 is a diagram showing an induction motor control system according to a fourth embodiment.

FIG. 10 is a diagram showing a fourth embodiment of the present invention. Note that, in the following description, parts corresponding to the parts of the other embodiments described above are denoted by the same reference numerals, detailed description thereof is omitted, and contents different from the above embodiments are mainly described.

An induction motor control system 114 in FIG. 10 includes a drive/monitoring device 170, motors 101, 102, and drive mechanisms 161, 162 coupled to these via rotary shafts 141, 142. In a case of rotating wheels, the drive mechanisms 161, 162 move a conveyed object 12 in a tangential direction (upward or downward on a paper surface). Alternatively, rails for railroads may be provided in place of the conveyed object 12, and the drive mechanisms 151, 162 themselves may move in the tangential direction on the rails.

The drive/monitoring device 170 includes a control unit 30, an inverter 22, an overheat detection unit 180, and an average value calculation unit 182. The average value calculation unit 182 calculates an average value of current detection values $I_{u1}$ and $I_{u2}$ and an average value of current detection values $I_{w1}$ and $I_{w2}$, and outputs these as current detection values $I_{us}$ and $I_{ws}$.

Configurations of the control unit 30 and the inverter 22 are the same as those in the first embodiment described above (see FIG. 1). A configuration of the overheat detection unit 180 is the same as that of the monitoring device 160 (see FIG. 9) in the third embodiment. Therefore, the drive/monitoring device 170 of the present embodiment has a function that combines functions of a drive device 20 and the monitoring device 160 in the third embodiment. Note that the present embodiment can also be configured by adding the overheat detection unit 180 and the average value calculation unit 182 to the existing drive device 20 (see FIG. 9).

Fifth Embodiment

Figure 11:
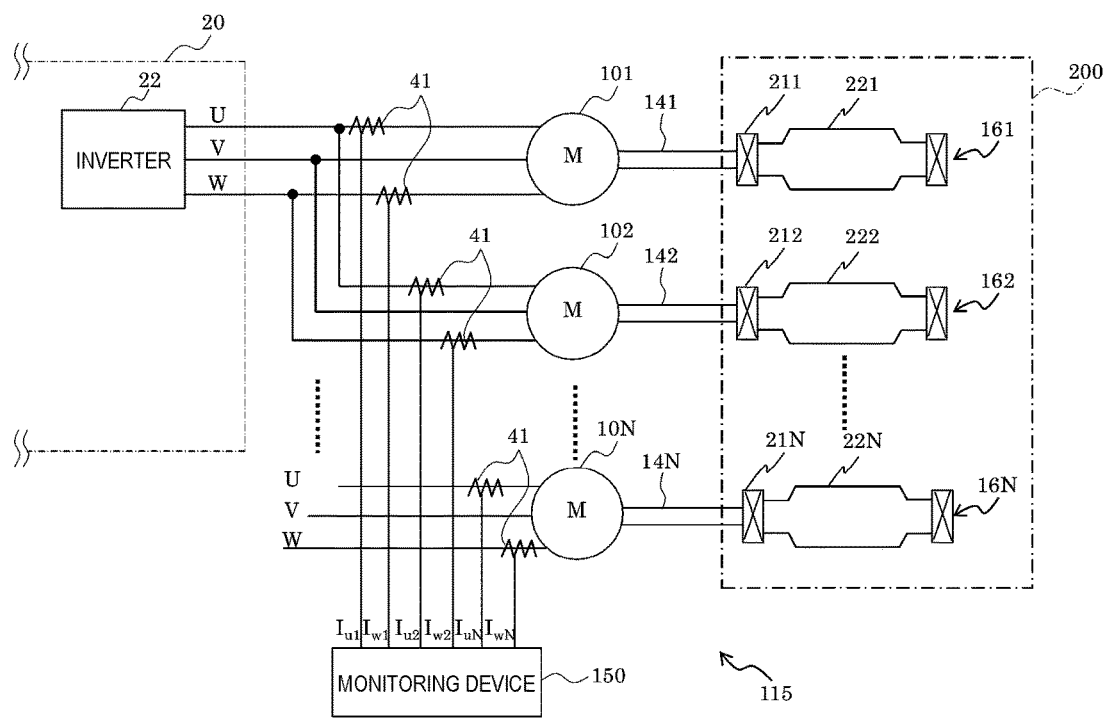
FIG. 11 is a diagram showing an induction motor control system according to a fifth embodiment.

FIG. 11 is a diagram showing a fifth embodiment of the present invention. FIG. 11 shows an example of an induction motor control system that drives a roller table 200. Note that, in the following description, parts corresponding to the parts of the other embodiments described above are denoted by the same reference numerals, detailed description thereof is omitted, and different parts are mainly described.

An induction motor control system 115 in FIG. 11 includes N (N is a natural number of 2 or more) motors 101 to 10N, rotary shafts 141 to 14N, N drive mechanisms 161 to 16N, a drive device 20, and a monitoring device 150. Further, the induction motor control system 115 includes the roller table 200 including a plurality of horizontally arranged rollers. The roller table 200 is composed of bearing portions 211 to 21N and the drive mechanisms 161 to 16N. The drive mechanisms 161 to 16N described above include the bearing portions 211 to 21N and a plurality of rollers 221 to 22N, respectively. The motor control system 115 drives, for example, a conveying roller that conveys a steel sheet rolled by a rolling mill (not shown). The rollers 221 to 22N are all driven at the same speed. Therefore, the motors 101 to 10N, which are driving sources of the rollers 221-22N, have the same specifications. A configuration of the present embodiment other than the above is the same as that of the second embodiment (see FIG. 8).

In a case of the roller table used in the hot rolling mill system, the steel sheet conveyed on the roller table 200 has a considerably high temperature, and each bearing portion 211 to 21N, coupling (not shown), motor 101 to 10N are in a harsh operating condition. For this reason, in order to prevent a situation such as a line stop, it has been common to install sensors such as a temperature sensor and a speed sensor for each individual diagnosis target such as a bearing and a motor, and analyze detection signals thereof to diagnose abnormalities. On the other hand, according to the present embodiment, it is unnecessary to mount a temperature sensor, a speed sensor, and the like on each motor. Therefore, it is possible to prevent the situation such as the line stop.

EXAMPLES OF OTHER EMBODIMENTS

Although several embodiments have been described above, the present invention is not limited to the above-described embodiments, and various modifications can be made. The above-described embodiments have been described as examples for easily understanding the present invention, and the present invention is not necessarily limited to those including all the configurations described. Further, a part of a configuration of one embodiment can be replaced with a configuration of another embodiment, and a configuration of another embodiment can be added to a configuration of one embodiment. Further, it is possible to delete a part of the configuration of each embodiment or add/replace another configuration. Further, the control lines and information lines shown in the drawings are those considered necessary for the explanation, and not all the control lines and information lines necessary for the product are shown. In fact, it can be considered that almost all the configurations are connected to each other. The possible modifications to the above embodiment are, for example, as follows.

(1) Hardware of the control unit 30, the monitoring devices 40, 150, 160, and the overheat detection unit 180 in the above embodiments can be realized by a general computer. Therefore, the algorithms shown in FIGS. 2 and 5 and the program shown in FIG. 7 may be stored in a storage medium or distributed via a transmission path.

(2) Although the algorithms shown in FIGS. 2 and 5 and the program shown in FIG. 7 have been described as software processing using the program in each of the above-described embodiments, a part or all of it may be replaced with hardware processing using an ASIC (Application Specific integrated circuit; IC for specific application), FPGA (field-programmable gate array), or the like.

(3) In the configuration of FIG. 8 and the like, only one inverter 22 is provided, but a plurality of inverters may be provided.

REFERENCE SIGNS LIST

10 induction motor
20 drive device
22 inverter
24 current sensor
30 control unit
40 monitoring device
41 current sensor
42 motor information calculation unit
44 feature amount calculation unit
45 temperature calculation unit
46 data storage unit
48 overheat determination unit
52 3Φ/αβ converter
54 arctangent converter
56 subtractor
60 phase synchronization calculation unit
55 integrator
62 multiplier
64 multiplier
66 integrator
72 integrator
74 multiplier
101 to 10N induction motor
111 to 115 induction motor control system
150 monitoring device
160 monitoring device
180 overheat detection unit
401 to 40N current sensor

The invention claimed is:

1. An induction motor overheat monitoring method in an induction motor control system equipped with at least one induction motor, an inverter that supplies an alternating current to the induction motor, and a control unit that controls the inverter, the induction motor overheat monitoring method comprising:
storing resistance calculation relationship data indicating a relationship between a resistance and a feature amount at a time of starting of the induction motor and a determination reference value for determining an overheat state;
detecting a current of the induction motor;
obtaining a phase angle from the detected current, and calculating a signal regarding a phase angle difference from a difference between the phase angle and a signal in which the phase angle is phase-synchronized, at a time of starting during an operation period;
calculating a feature amount of the motor from the signal regarding the phase angle difference;
calculating a resistance of the induction motor by using the feature amount of the motor and the resistance calculation relationship data, and then calculating a temperature of the induction motor from the calculated resistance; and
determining an overheat state by comparing the calculated temperature of the induction motor and the determination reference value.

2. The induction motor overheat monitoring method according to claim 1, wherein
the feature amount of the motor is a gradient and a phase difference of a waveform obtained by comparing a signal regarding the phase angle difference, which is a reference, and the signal regarding the phase angle difference at the time of starting.

3. The induction motor overheat monitoring method according to claim 1, further comprising
outputting an alarm signal to an outside when the overheat state is detected.

4. The induction motor overheat monitoring method according to claim 1, further comprising
outputting a control command for reducing the temperature of the induction motor to the control unit when the overheat state is detected.

5. The induction motor overheat monitoring method according to claim 1, wherein
the motor control system has a plurality of the induction motors and the inverters, currents of the plurality of induction motors are detected, the signal regarding the phase angle difference is calculated for the plurality of induction motors, the temperature of the induction motor is calculated for the plurality of induction motors, and the determination is made to determine the overheat states of the plurality of induction motors.

6. An induction motor overheat monitoring device in a motor control system equipped with at least one induction motor, an inverter that supplies an alternating current to the induction motor, and a control unit that controls the inverter, the induction motor overheat monitoring device comprising:
a data storage unit that stores resistance calculation relationship data indicating a relationship between a resistance and a feature amount at a time of starting of the induction motor and a determination reference value for determining overheat;
a current sensor that detects a current of the induction motor;
a motor information calculation unit that obtains a phase angle from the detected current, and calculates a signal regarding a phase angle difference from a difference between the phase angle and a signal in which the phase angle is phase-synchronized, at a time of starting during an operation period;
a feature amount calculation unit that calculates a feature amount of the motor obtained from the signal regarding the phase angle difference;
a temperature calculation unit that calculates a resistance of the induction motor by using the feature amount of the motor and the resistance calculation relationship data, and then calculates a temperature of the induction motor from the calculated resistance; and
an overheat determination unit that determines an overheat state by comparing the calculated temperature of the induction motor and the determination reference value.

7. The induction motor overheat monitoring device according to claim 6, wherein
the feature amount obtained from the phase angle of the current is a gradient and a phase difference of a waveform obtained by comparing a signal regarding the phase angle, which is a reference, and the signal regarding the phase angle difference at the time of starting.

8. The induction motor overheat monitoring device according to claim 6, wherein
the overheat determination unit outputs an alarm signal by detecting the overheat state.

9. The induction motor overheat monitoring device according to claim 6, wherein
the overheat determination unit outputs a control command for reducing the temperature of the induction motor to the control unit by detecting the overheat state.

10. The induction motor overheat monitoring device according to claim 6 for use in a motor control system including a plurality of the induction motors and a plurality of the inverters for driving the plurality of induction motors, wherein
a plurality of sets of current sensors that detects currents flowing through the plurality of induction motors is provided, and
by using detection values of the current sensors, the motor information calculation unit, the feature amount calculation unit, and the temperature calculation unit perform calculations, and the overheat determination unit determines overheat states of the plurality of induction motors.

11. An induction motor control system comprising:
at least one induction motor;
an inverter that supplies an alternating current to the induction motor;
a control unit that controls the inverter; and
an overheat detection unit that detects an overheat state of a temperature of the induction motor,
wherein the overheat detection unit includes
a data storage unit that stores resistance calculation relationship data indicating a relationship between a resistance and a feature amount at a time of starting of the induction motor and a determination reference value for determining the overheat,
a current sensor that detects a current of the induction motor,
a motor information calculation unit that obtains a phase angle from the detected current, and calculates a signal regarding a phase angle difference from a difference between the phase angle and a signal in which the phase angle is phase-synchronized, at a time of starting during an operation period,
a feature amount calculation unit that calculates a feature amount of the motor obtained from the signal regarding the phase angle difference,
a temperature calculation unit that calculates a resistance of the induction motor by using the feature amount of the motor and the resistance calculation relationship data, and then calculates a temperature of the induction motor from the calculated resistance, and
an overheat determination unit that determines an overheat state by comparing the calculated temperature of the induction motor and the determination reference value.

12. The induction motor control system according to claim 11, wherein
the overheat unit outputs a control command for reducing the overheat state to the control unit when the overheat state is determined.

13. The induction motor control system according to claim 11, wherein
the induction motor drives a roller table.

* * * * *